United States Patent [19]

Schutten et al.

[11] 4,435,750

[45] Mar. 6, 1984

[54] RECTIFIED AC FREQUENCY CONVERTER

[75] Inventors: Herman P. Schutten; Robert W. Sackett, both of Milwaukee; Jan K. Sedivy, Elm Grove; Michael E. Taken, Cedarburg, all of Wis.

[73] Assignee: Eaton Corporation, Cleveland, Ohio

[21] Appl. No.: 403,249

[22] Filed: Jul. 29, 1982

[51] Int. Cl.³ .................................... H02M 5/34
[52] U.S. Cl. .................................... 363/177; 328/21
[58] Field of Search ................... 328/21, 26, 32; 363/124, 125, 126, 159, 177, 165

[56] References Cited

FOREIGN PATENT DOCUMENTS 541937  4/1956  Italy .................................... 363/177

OTHER PUBLICATIONS

"Power Transistor Applications for Switching Regulators and Motor Control," Marvin W. Smith, General Electric Co., Semiconductor Products Dept., Auburn, N.Y., Oct. 1979, pp. 22–23.

Primary Examiner—William M. Shoop
Attorney, Agent, or Firm—C. H. Grace; M. E. Taken

[57] ABSTRACT

A simple rectified AC frequency conversion technique is provided by chopping positively and negatively rectified AC signals by alternatively switching therebetween to yield a switched output waveform of given frequency without capacitive filtering to DC. The direct AC switching provides an irregular chopped sinusoid output waveform.

7 Claims, 4 Drawing Figures

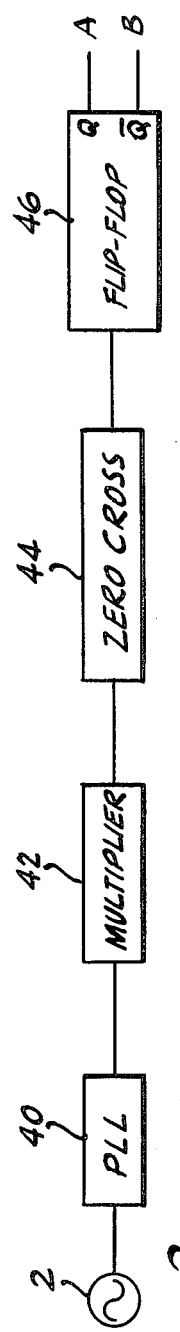
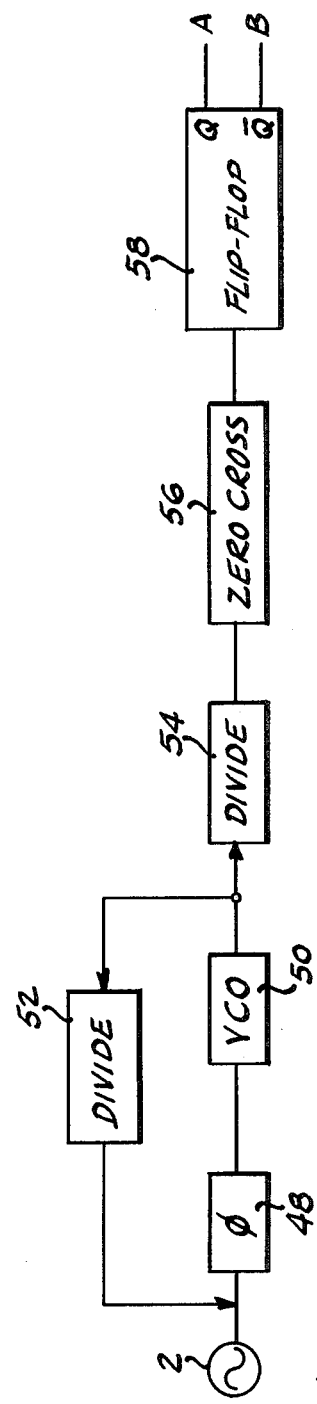

RECTIFIED AC FREQUENCY CONVERTER

BACKGROUND AND SUMMARY

The invention relates to AC frequency converters.

Various AC frequency conversion techniques are known in the art. One technique is called the converter-inverter approach, or the step converter method. In this approach, AC voltage is rectified through a diode rectifier bridge, and then smoothed to level DC by means of a capacitor. This level DC voltage is then used to synthesize a series of incremental steps to approximate a given sine wave voltage of desired frequency, for example "Power Transistor Applications for Switching Regulators and Motor Control," Marvin W. Smith, General Electric Co., Semiconductor Products Dept., Auburn, N.Y., October, 1979, pages 22–23.

The present invention provides a simple yet effective AC frequency conversion technique wherein the rectified AC signal from the bridge is directly switched to an output without capacitive filtering to DC, and thus without the processing or switching of DC as in the step converter method.

The invention is particularly useful for up conversion in certain motor control applications, specifically where an increase in frequency is desired for only short periods of time compared with normal lower frequency run-time. An example is refrigeration control where the compressor must be designed for the worst case situation even though such worst case occurs perhaps only 1% of the time, for example when a freezer must cool down a whole new supply of food. During the other 99% of the time, the compressor must only maintain an already cool condition, and thus may only need perhaps half its capacity. One solution to this over-capacity is to use a smaller compressor and run it at normal speed for normal duty, and run it at a higher speed during the small percentage of time needed for higher capacity cooling, i.e. during the 1% cool-down time. This faster speed operation is not detrimental to the compressor for short periods of time.

In the present invention, the AC frequency may be increased in a simple manner for running the compressor at a faster speed. A trade-off in the present frequency conversion technique is that the resultant chopped sinusoid output waveform of increased frequency is less efficient than the input AC frequency. This less efficient use of electrical power is far outweighed by the reduction in compressor capacity enabled thereby. Furthermore, during the 99% normal run-time, a smaller compressor is driven by a smaller motor at its most efficient load rating.

BRIEF DESCRIPTION OF THE DRAWINGS

FIG. 3 is a schematic circuit diagram illustrating a timing control for the circuit of FIG. 1.

FIG. 4 is a schematic circuit diagram illustrating another timing control for the circuit of FIG. 1.

DETAILED DESCRIPTION

Figure 1:
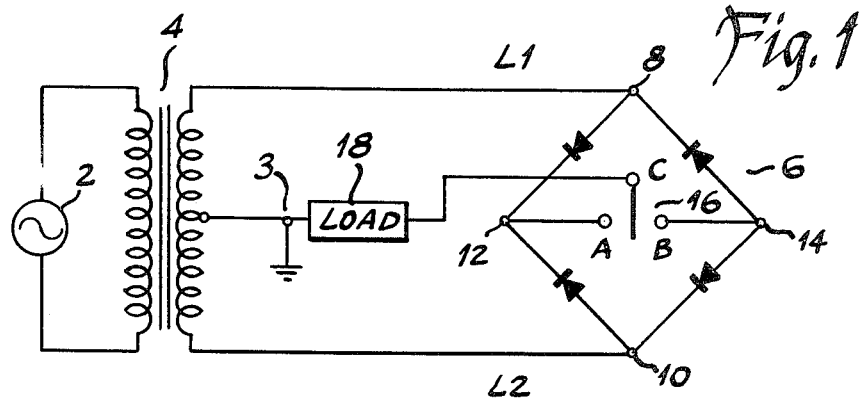
FIG. 1 is a schematic circuit diagram for illustrating the frequency conversion technique in accordance with the invention.

Referring to FIG. 1 there is shown a pair of power lines L1 and L2 supplied with an AC line frequency signal, typically 60 hertz, from AC source 2 through transformer 4. Diode bridge rectifier means 6 has a pair of AC inputs 8 and 10 for connection to the AC signal on lines L1 and L2, and has positive and negative rectified AC points 12 and 14. Switched output means 16 controllably connects point C to either point A or point B which are the positively and negatively rectified AC signals, respectively. Load 18 is connected between point C and a center tap 3 of transformer 4, or alternatively to a grounded neutral of a 3 wire single phase AC source. The ground shown at 3 is the reference for timing lines, and is not required for operation.

In prior systems, filtering capacitors are connected between points 12 and 3 and between points 14 and 3. Such type of system is known as a converter-inverter system, for example as shown in "Power Transistor Applications for Switching Regulators and Motor Control:," Marvin W. Smith, General Electric Co., Semiconductor Products Dept., Auburn, N.Y., October, 1979, pages 22–23. In such prior system, switch means 16 is switched to provide a series of incremental steps cumulatively approximating a sine wave of voltage of given frequency. This is a processed or synthesized sine wave voltage. Switched output means 16 typically comprises a pair of power transistors, SCR's, or the like, connected from points A and B to point C. Snubber circuitry (not shown), such as varistors, is typically provided in parallel with the load or in parallel with the switch means to protect the latter from transient voltage spikes, and the like.

Figure 2:
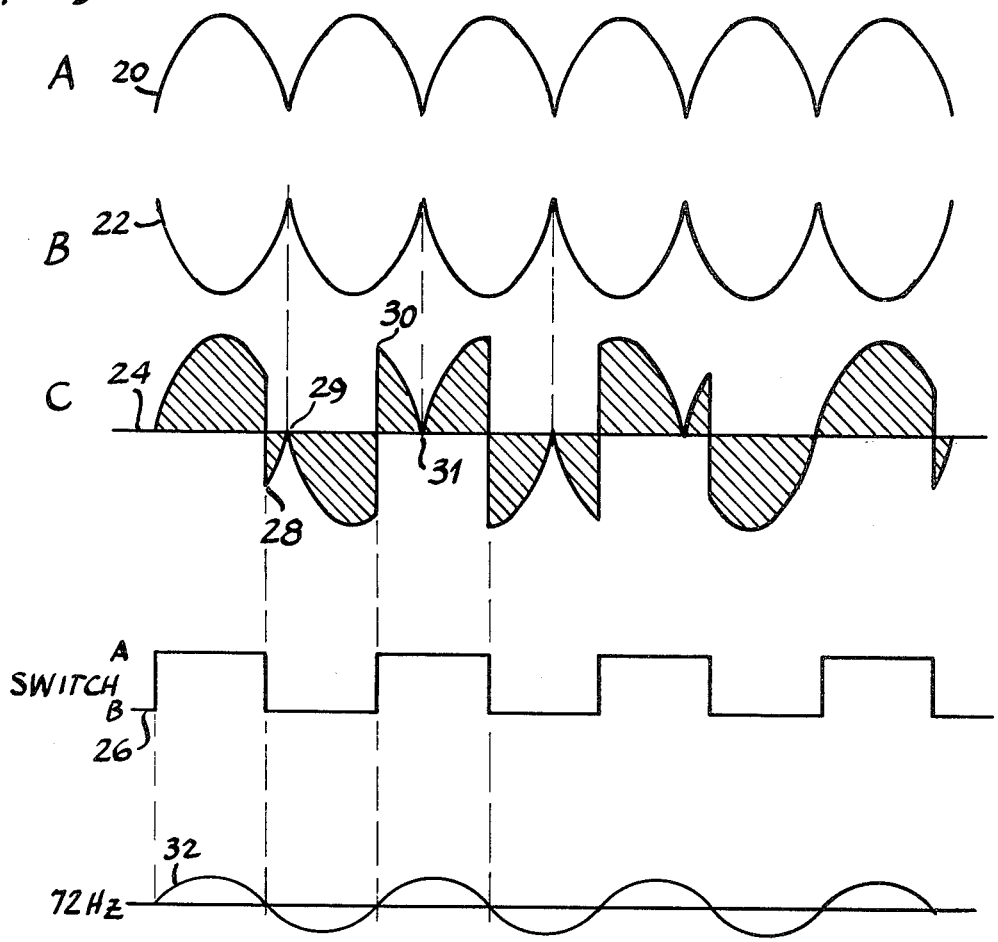
FIG. 2 is a timing diagram illustrating operation of the circuit of FIG. 1 in accordance with the invention.

In the present invention, the positively and negatively rectified AC signals are not filtered, but rather are chopped by alternately switching therebetween to yield a switched output waveform of given frequency having a positive half cycle following a given segment of the signal at point A and having a negative half cycle following a given segment of the signal at point B. Snubber circuitry may be provided if desired. FIG. 2 shows at waveform 20 the positively rectified AC signal at point A, and shows at waveform 22 the negatively rectified AC signal at point B. Timing line 24 shows the switched output waveform at point C which is a chopped sinusoid.

In the disclosed embodiment, a 60 hertz AC input signal is provided, and switched output means 16 is alternately switched between points A and B as shown at 72 hertz timing signal 26. Switch 16 switches to point A at each positive-going transition of signal 26, and switch 16 switches to point B at each negative-going transition of signal 26. These toggling transitions occur at the rate of 144 times per second. The waveform on point C as shown on timing line 24 is a chopped sinusoid. This chopped sinusoid waveform is irregular and includes a plurality of inflection points such as 28 through 31 in each cycle. Waveform 32 shows the fundamental frequency component of the chopped sinusoid waveform at point C on timing line 24. Waveform 32 is cyclic at a 72 hertz rate.

The waveform on line 24 is less efficient than the waveform of the input AC signal. This reduction in efficiency is due to the irregular shape and the plurality of transitions preventing a smooth voltage buildup. This reduced efficiency, however, is tolerable in applications where a higher speed is needed only for a small percentage of time compared with the normal duty.

The switched output waveform on line 24 has an inflection point at each transition of switched output means 16 which does not correspond to a zero crossing of the AC signal. FIG. 3 illustrates an exemplary timing control for the circuit of FIG. 1 to yield the timing signal 26 of FIG. 2. A phase lock loop 40 extracts the frequency of AC source 2. The output of phase lock loop 40 is multiplied by a given factor by clock multiplier 42, such as a frequency synthesizer. In the example in FIG. 2, the multiplication factor is 6/5. The output of multiplier 42 is delivered to a zero crossing detector 44, whose output toggles flip-flop 46 between its Q and $\overline{Q}$ outputs to switch between points A and B, thus yielding the timed switching pattern 26 in FIG. 2.

An alternative is shown in FIG. 4 wherein the phase detector 48 and the voltage controlled oscillator 50 of the phase lock loop are provided with a feedback divider 52, for example a counter, from the output of VCO 50 to the input of phase detector 48. As is known, if divider 52 performs a divide by 6 operation, then the output of VCO 50 will have a frequency 6 times as great as the input from source 2. The output of VCO 50 is delivered to a divider 54 which in the above example performs a divide by 5 operation, such that the output of divider 54 has a frequency of 6/5 as great as the input from source 2. The output of divider 54 is delivered to a zero crossing detector 56, whose output toggles flip-flop 58 between states A and B.

While the 60 hertz line and 72 hertz output frequencies have been given as examples, it is readily appreciated that other fractional frequency changes are within the scope of the invention. For example, in FIG. 4, divider 52 provides the numerator and divider 54 provides the denominator of the frequency change fraction. Furthermore it is not necessary that switch 16 be controlled by some fraction of AC line frequency. For example, the switch can be toggled at a variable frequency rate.

It is recognized that various modifications are possible within the scope of the appended claims.

We claim:

1. A frequency conversion technique for an AC signal, comprising rectifying said AC signal to a positively rectified AC signal and to a negatively rectified AC signal, and chopping said positively and negatively rectified AC signals by alternating switching therebetween to yield a switched output waveform of given frequency having a positive half cycle following a given segment of said positively rectified AC signal, and having a negative half cycle following a given segment of said negatively rectified AC signal.

2. The invention according to claim 1 wherein said switched output waveform comprises a chopped sinusoid switched at any point in the AC cycle between said positively and negatively rectified AC signals.

3. The invention according to claim 2 wherein said chopped sinusoid waveform is cyclic but irregular, and includes a plurality of inflection points in each cycle for conversion to a higher frequency.

4. Frequency conversion apparatus for an AC signal, comprising:
bridge rectifier means having a pair of AC inputs for connection to said AC signal, and having positive and negative full-wave rectified AC points;
switched output means controllably connectable to said positive and said negative rectified AC points, and comprising control means for controlling the connection of said switched output means to said positive and said negative rectified AC points and alternately switching therebetween at a given frequency to yield a switched output waveform of said given frequency having a positive half cycle connected to said positive AC rectified point, and having a negative half cycle connected to said negative rectified AC point.

5. The invention according to claim 4 wherein said switched output waveform comprises a chopped sinusoid having an inflection point at each transition of said switched output means which does not correspond to a zero crossing of said AC signal.

6. A frequency conversion technique for an AC signal, comprising rectifying said AC signal to a positively full-wave rectified AC signal and to a negatively full-wave AC signal, and chopping said positively and negatively rectified AC signals by alternately switching therebetween to yield a switched output waveform of given frequency having a positive half cycle tracking a given segment of said positively rectified AC signal, and having a negative half cycle tracking a given segment of said negatively rectified AC signal.

7. The invention according to claim 6 wherein said switched output waveform comprises a chopped sinusoid switched at any point in the AC cycle to yield any up-converted or down-converted output frequency.

* * * * *